(12) United States Patent
Vernon et al.

(10) Patent No.: US 11,789,463 B2
(45) Date of Patent: *Oct. 17, 2023

(54) METHODS AND APPARATUS FOR NAVIGATING AN UNMANNED VEHICLE BASED ON A CALCULATION OF RELATIVE DISTANCE DIFFERENCES BETWEEN A START LOCATION AND A DESIGNATED DROP LOCATION

(71) Applicant: DroneUp, LLC, Virginia Beach, VA (US)

(72) Inventors: John Vernon, Virginia Beach, VA (US); Oleksii Naboichenko, Chesapeake, VA (US)

(73) Assignee: Drone Up, LLC, Virginia Beach, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,595

(22) Filed: Aug. 22, 2022

(65) Prior Publication Data

US 2022/0404838 A1 Dec. 22, 2022

Related U.S. Application Data

(63) Continuation of application No. 17/505,016, filed on Oct. 19, 2021, now Pat. No. 11,422,572.

(Continued)

(51) Int. Cl.
| | | |
|---|---|---|
| *G01C 1/00* | (2006.01) | |
| *G05D 1/00* | (2006.01) | |
| *B64C 39/02* | (2023.01) | |
| *B64D 1/12* | (2006.01) | |
| *G05D 1/04* | (2006.01) | |

(Continued)

(52) U.S. Cl.
CPC .......... *G05D 1/042* (2013.01); *B64C 39/024* (2013.01); *B64D 1/12* (2013.01); *G01C 21/3896* (2020.08);

(Continued)

(58) Field of Classification Search
CPC .......... G05D 1/042; G05D 1/106; G05D 1/00; B64C 39/024; B64C 39/02; B64D 1/12;
(Continued)

(56) References Cited

U.S. PATENT DOCUMENTS

| | | |
|---|---|---|
| 9,412,280 B1 | 8/2016 | Zwillinger et al. |
| 9,580,173 B1 | 2/2017 | Burgess et al. |

(Continued)

OTHER PUBLICATIONS

International Search Report and Written Opinion for International Application No. PCT/US2021/055612 dated Feb. 7, 2022, 14 pages.

*Primary Examiner* — Yonel Beaulieu
(74) *Attorney, Agent, or Firm* — COOLEY LLP

(57) ABSTRACT

Unmanned autonomous vehicle (UAV) selection information identifying a UAV, flight path information, and a relative elevation difference value that is a difference between a first elevation value of a start location and a second elevation value of a drop location are received. Navigation of the UAV is initiated using the UAV selection information and the flight path information. A relative altitude difference value is obtained using a first altitude value of the UAV associated with the start location and a second altitude value of the UAV associated with the drop location. In response to a difference between the relative elevation difference value and the relative altitude difference value being outside a predefined threshold, UAV is caused to adjust the second altitude value such that an updated difference between the relative elevation difference value and an updated relative altitude difference value is within the predefined threshold.

21 Claims, 7 Drawing Sheets

Related U.S. Application Data

(60) Provisional application No. 63/094,012, filed on Oct. 20, 2020.

(51) Int. Cl.
  *G01C 21/00* (2006.01)
  *G06Q 10/0835* (2023.01)
  *B64U 101/60* (2023.01)

(52) U.S. Cl.
  CPC ... *G06Q 10/08355* (2013.01); *B64U 2101/60* (2023.01); *B64U 2201/104* (2023.01)

(58) Field of Classification Search
  CPC .......... G01C 21/3896; G06Q 10/08355; B64U 2101/60; B64U 2201/104; G08G 5/0013; G08G 5/0026; G08G 5/0034; G08G 5/0069; G08G 5/00
  See application file for complete search history.

(56) References Cited

U.S. PATENT DOCUMENTS

| | | |
|---|---|---|
| 9,849,981 B1 | 12/2017 | Burgess et al. |
| 10,410,532 B1 | 9/2019 | Myr |
| 10,741,088 B1 | 8/2020 | Walker et al. |
| 11,225,325 B1 | 1/2022 | Evans |
| 11,422,572 B2 * | 8/2022 | Vernon .............. G01C 21/3896 |
| 2017/0227968 A1 | 8/2017 | Klinger et al. |
| 2017/0267343 A1 | 9/2017 | Chen et al. |
| 2020/0011687 A1 | 1/2020 | Lindemann et al. |
| 2020/0207474 A1 | 7/2020 | Foggia et al. |
| 2020/0312157 A1 | 10/2020 | Hawley et al. |
| 2021/0027224 A1 | 1/2021 | Adler |
| 2021/0209954 A1 | 7/2021 | Tazume et al. |
| 2021/0225176 A1 | 7/2021 | Kusumi et al. |
| 2021/0258834 A1 | 8/2021 | Pastuszak et al. |

* cited by examiner

METHODS AND APPARATUS FOR NAVIGATING AN UNMANNED VEHICLE BASED ON A CALCULATION OF RELATIVE DISTANCE DIFFERENCES BETWEEN A START LOCATION AND A DESIGNATED DROP LOCATION

RELATED PATENT APPLICATIONS

This application is a continuation of U.S. application Ser. No. 17/505,016, filed Oct. 19, 2021 and entitled "Methods and Apparatus for Navigating an Unmanned Vehicle Based on a Calculation of Relative Distance Differences Between a Start Location and a Designated Drop Location," now U.S. Pat. No. 11,442,572, which claims priority to U.S. provisional patent application No. 63/094,012, filed on Oct. 20, 2020 and entitled "Methods and Apparatus for Selecting a Drone Flight Path Based on a Calculation of Altitude Differences Between a Start Location and a Designed Drop Location," each of which is incorporated herein by reference.

FIELD

In one or more embodiments, a vehicle, such as an unmanned aerial vehicle (UAV), navigates from a start location to a drop location to drop a product and using relative elevation and altitude differences between the start location and the drop location.

BACKGROUND

Autonomous aerial vehicles (UAVs), also referred to as aerial drones or drones, are used in a variety of ways including aerial photography, infrastructure inspection, and product delivery. Such known aerial drone usage often involve an awareness of altitude to avoid interfering with objects, people, animals on the ground. This can be complicated when the aerial drone is carrying a package. Thus, a need exists for improved techniques for determining an altitude of aerial drones and deploying the aerial drones based on that altitude.

SUMMARY

Figure 1:
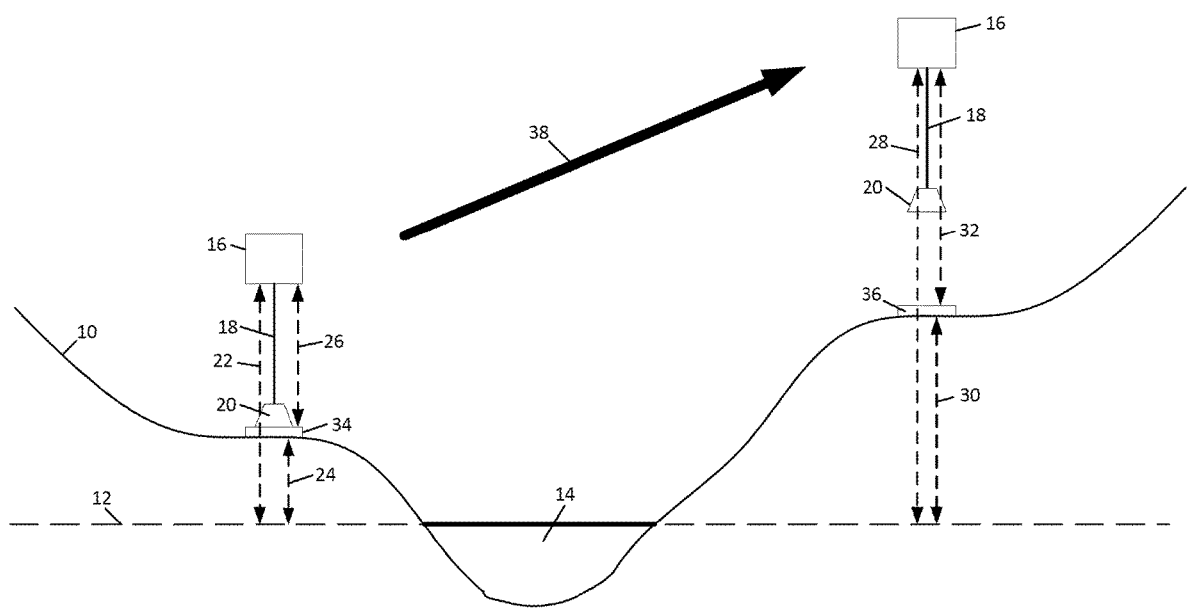
FIG. 1 shows an illustration for identifying height of a drone relative to a drop location using altitude and elevation information, according to an embodiment.

In an embodiment, a method comprises receiving (1) unmanned autonomous vehicle (UAV) selection information identifying a UAV, (2) flight path information, and (3) a relative elevation difference value that is a difference between a first elevation value of a start location and a second elevation value of a drop location. Navigation of the UAV is initiated using the UAV selection information and the flight path information. A relative altitude difference value is obtained using a first altitude value of the UAV associated with the start location and a second altitude value of the UAV associated with the drop location. In response to a difference between the relative elevation difference value and the relative altitude difference value being outside a predefined threshold, UAV is caused to adjust the second altitude value such that an updated difference between the relative elevation difference value and an updated relative altitude difference value is within the predefined threshold.

In an embodiment, a method comprises receiving an order that includes a representation of an identity of a product and a drop location for the product. UAV selection information is generated identifying a UAV, and flight path information is generated for the UAV. A relative elevation difference value is obtained using a first elevation value of a start location and a second elevation value of the drop location. A representation of the UAV selection information, the flight path information and the relative elevation difference value to a UAV controller is transmitted to cause the UAV controller to obtain a relative altitude difference value using a first altitude value of the UAV associated with the start location and a second altitude value of the UAV associated with the drop location. In response to a difference between the relative elevation difference value and the relative altitude difference value being outside a predefined threshold, the UAV is caused to adjust the second altitude value such that an updated difference between the relative elevation difference value and an updated relative altitude difference value is within the predefined threshold.

In an embodiment, a method comprises receiving an order including a representation of an identity of a product and a drop location for the product. A signal representing the order is transmitted to a compute device to cause the compute device to (1) generate unmanned autonomous vehicle (UAV) selection information, flight path information and a relative elevation difference value that is a difference between a first elevation value of a start location and a second elevation value of a drop location, and (2) cause an UAV controller to obtain a relative altitude difference value using a first altitude value of an UAV associated with the start location and a second altitude value of the UAV associated with the drop location. In response to a difference between the relative elevation difference value and the relative altitude difference value being outside a predefined threshold, the UAV is caused to adjust the second altitude value such that an updated difference between the relative elevation difference value and an updated relative altitude difference value is within the predefined threshold.

DETAILED DESCRIPTION

In one or more embodiments, a resident via a resident compute device can request a product(s) to be delivered. The resident can optionally include a transceiver and a global positioning system (GPS) transceiver physically located, for example, at a designed drop location such as particular location within a resident's backyard designated as a "landing zone" for receiving drone deliveries. A retailer compute device can receive the request from the resident compute device and forward the request to a compute device that generates a flight plan and a mission for a UAV(s) to deliver the product(s) to the residence (e.g., at the "landing zone" of the residence). Although aerial drones will be referred to when discussing the embodiments herein, it can be appreciated that UAVs can include an aerial drone, boat drone, land drone (e.g., truck), and the like.

Drone delivery, however, faces certain challenges including for example uncertainty in the height of the drone relative to the designated drop location, potential inconsistencies in the height measurements of drone sensors, etc. Known height sensors include, for example, a light detection and ranging (LiDAR) sensor that measures the height (e.g., the distance between the drone and an object such as the ground). Regarding LiDAR sensors, a drone often carries a product for delivery via a tether (e.g., eight foot tether) that allows the drone to land the product on the ground while keeping the drone airborne and out of reach of people and others (e.g., a jumping dog). This also allows the drone to deliver the product in the designated drop location without having to land or take off after landing. But, the tethered product can interfere with height measurements by sensors on the drone such as a light detection and ranging (LiDAR) sensor, which can mistakenly measure the distance between the drone and the tethered product rather than the distance between the drone and the ground. Some drones, however, may lack any sensor that can provide height information at all. In these various situations, it may be desirable to have an alternative way to determine the height of the drone relative to the ground at the designated drop location, which can be used to check against sensor measurements of height or can be used in lieu of height sensors when they are not present on the drone.

In one or more embodiments, the height of the drone relative to the ground can be determined by obtaining (1) predetermined elevation values of the start location of the drone and the designated drop location for the product, and (2) the altitude values of the UAV near the start location and the drop location. In some embodiments, the altitude values can be obtained using altitude sensors (e.g., GPS sensor, barometric pressure sensor). In some embodiments, the elevation values can be obtained from predetermined information (e.g., the known elevation of the start location of the drone launch), models that can derive and/or or databases that contain the elevation values of the start location of the drone and the designated drop location. For example, the U.S. Geological Survey (USGS) provides elevation maps such as The National Map, which provides topographic information for the US. Alternatively or in addition to the USGS elevation maps, digital elevation models (DEMs) or point clouds can be used to provide elevation maps. This topographic information can be used to develop a database(s) that indicates elevation information for a particular geographic area(s) where the drone(s) will be used. A relative difference between the elevation of the start location and the elevation of the designated drop location, as well as a relative difference between the altitude of the drone near the start location and the designed drop location, can then be calculated and subsequently used by the drone as a proxy for height at the designated drop location, as described further below.

FIG. 1 shows an illustration of adjusting height at a drop location using elevation and altitude information associated with the start and drop locations. Elevation herein refers to the vertical position of a point/location or an object that is on the earth's surface relative to sea level. Altitude herein refers to refers to the vertical position of a point/location or an object that is above the earth's surface relative to sea level. Height herein refers to the difference in distance between a first point or a first object that is above the earth's surface (i.e., having an altitude value), and a second point or second object that is on earth's surface (i.e., having an elevation value). FIG. 1 includes a drone 16 operatively coupled (e.g., mechanically coupled) to a product 20 via a tether 18 at a start location 34. In other words, the tether 18 can be operatively coupled to the product 20 via a mechanical coupling at a first end of the tether 18, and to the drone 16 via a mechanical coupling at a second end of the tether 18. Any type of mechanical coupling can be used, such as a fixed coupling (e.g., crimp, adhesive), a removable coupling (e.g., ball-and-socket, tied off in an eyelet, buckle, hook), or a combination thereof. The start location 34 is on the earth's surface 10 above the sea 14 and mean sea level 12. The altitude 22 refers to the distance between the mean sea level 12 and the drone 16, the elevation 24 refers to the distance between the start location 34 and the mean sea level 12, and the height 26 refers to the distance between the drone 16 and the start location 34. Once the drone 16 is at a desirable height 26 (e.g., a desired height that the drone 16 is relative to a drop location 36, a height when the drone 16 has taken up slack in the tether 18, a height when the product 20 is slightly above the ground), a value representing the altitude 22 can be obtained (e.g., via an altitude sensor). A value representing the elevation 24 can also be obtained (e.g., via a GPS sensor and a database with elevation values at different GPS coordinates). Alternatively, a value representing the elevation 24 can be known beforehand, or obtained later (e.g., via a database).

Thereafter, the drone 16 can take a flight path 38 to arrive near the drop location 36, though, as can be seen in the example of FIG. 1, the product 20 has not been delivered to the drop location 36 yet. The drone 16 can measure its altitude 28, and using a representation of the elevation 30 of the drop location 36, the drone 16 can adjust its current height 32 such that the product 20 is closer to the drop location 36. For example, the drone 16 can take additional altitude measurements as it updates, until the height 32 has been adjusted to be within an acceptable range relative to height 26. The height 32 can be within an acceptable range, for example, in the context of placing the product 20 on the ground at the drop location 36 or releasing the product 20 at a height above the ground at drop location 36 that is small enough that the product 20 is not damaged upon release from the drone 16 and contact with the ground. Thus, the drone 16 can deliver the product 20 to the drop location 36 without making a distance measurement between itself and the drop location 36.

Figure 2:
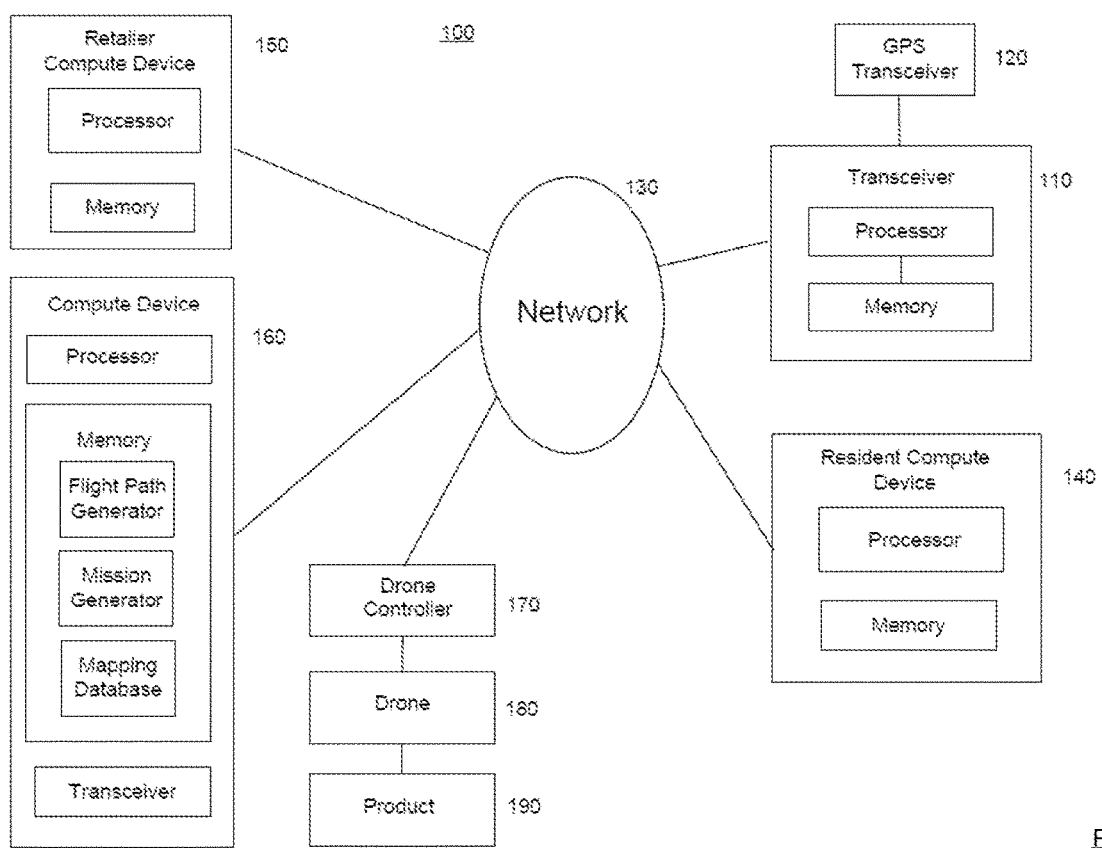
FIG. 2 shows a system block diagram of a drone supply system, according to an embodiment.

FIG. 2 shows a system block diagram of a drone supply system 100, according to an embodiment. The drone resupply system 100 includes transceiver 110, which is operatively coupled to a global positioning system (GPS) transceiver 120. Transceiver 110 is operatively coupled to network 130, which in turn is operatively coupled to resident compute device 140, retailer compute device 150, compute device 160 and drone controller 170. Drone controller 170 is also operatively coupled to drone 180, which is configured to deliver a resupply product 190.

Each of transceiver 110 and GPS transceiver 120 can be physically located, for example, at a designed drop location such as particular location within a resident's backyard. More specifically, the transceiver 110 and GPS transceiver 120 can be located in a designated drop location of a person's backyard such in a corner of a backyard designated as a "landing zone" for receiving drone deliveries. Transceiver 110 can receive from GPS transceiver 120 a signal indicating the geolocation of the GPS transceiver 120 and optionally an indication of the accuracy of the geolocation. More specifically, the GPS transceiver 120 can receive satellite signals and derive a location identification based on the received satellite signals. The GPS transceiver 120 can provide the location identification to the transceiver 110. The GPS transceiver 120 can be configured to provide the location identification to the transceiver 110 continuously, repeatedly and/or upon request.

Transceiver 110 and GPS transceiver 120 can be used in conjunction with a resident compute device 140 that requests supply (or resupply) of product(s). For example, a resident of a home can have resident compute device 140 such as a desktop computer, laptop computer and/or smart phone to place an order or make a request for a product to be supplied. Such an order or request can specify the product and optionally the product quantity to be delivered to the resident. Alternatively, a standing (or predefined) order or request can be referenced to order or reorder the product(s) and the quantity for that produce(s). Optionally, the resident compute device 140 can provide an address of the residence address. The order or request for product(s) can be sent from the transceiver 110 and/or resident compute device 140 to a retailer compute device 150, which in turn can communicate with compute device 160 to initiate the drone delivery process, described below in greater detail.

In instances where the transceiver 110 receives the product, quantity information and/or residence address from resident compute device 140, transceiver 110 can define a signal representing or identifying the product, quantity information for the product(s), and/or the residence address, in addition to the GPS coordinates and/or GPS accuracy received from GPS transceiver 120. Alternatively, in the instances where the resident compute device 140 receives the GPS coordinates and/or GPS accuracy form the transceiver 110, resident compute device 140 can define a signal representing or identifying the product, quantity information for the product(s), the residence address, the GPS coordinates and/or GPS accuracy. Transceiver 110 and/or resident compute device, respectively, can then send the signal to retailer compute device 150 via network 130 such that the retailer compute device 150 subsequently sends the product and/or quantity information to compute device 160. Once compute device 160 receives the product, quantity information, residence compute device and/or GPS coordinates from retailer compute device 150, compute device 160 can automatically develop flight plan information and a drone selection, which is provided to drone controller 170 to initiate drone deliver of the product to the resident, as described further herein. Note that although retailer compute device 150 and compute device 160 are shown as separate compute devices, it should be understood that a single compute device or common control instead is possible, for example, where the retailer owns both the consumer facing website/ software and the website/software for automatically develop flight plan information and a drone selection.

Network 130 can be, for example, a wireless network(s) or a combination of a wireless network(s) and wired networks. More specifically, the connection between transceiver 110 and the network 130 is likely a connection over a wireless network(s) given the possible remote location of the individual with transceiver 110; the connections between each of compute devices 140, 150, 160 and network 130 can be a wireless connection(s) and/or wired connection(s). A wireless network(s) of network 130 can include or enable, for example, a satellite connection(s) by which transceiver 110 to connect to a satellite (not shown) and for the satellite to connect to a remaining portion of network 150 or to the compute devices 140, 150, 160. Although not shown, transceiver 110 and resident compute device 140 can be connected together by a wireless or wired connection without passing through network 130 (e.g., via WiFi® at the residence) and/or in combination with connections through network 130.

Resident compute device 140 and retailer compute device 150 each can be, for example, any type of computer, server, etc. that has a processor that executes instructions such as software instructions stored in a memory of that compute device. Resident compute device 140 and retailer compute device 150 each includes a processor and a memory operatively coupled to the processor. As mentioned above, resident compute device 140 can execute software to place an order or make a request for a product to be supplied. For example, resident compute device 140 can execute a browser that allows the resident to place an order or make a request for a product to be supplied from a retailer that operates a website accessible through the browser of the resident compute device 140.

Retailer compute device 150 can operate, control and/or access the retailer web site to receive the product order/ request. In instances where the product order/request includes a request for delivery by drone (or if the retailer determines/selects drone delivery), retailer compute device 150 can communicate with compute device 160 to initiate the drone delivery process for the ordered/requested product. For example, retailer compute device 150 can send to compute device 160 a signal indicating the product(s), product quantity(ies), and resident location (e.g., address and/or GPS coordinates and/or GPS accuracy as provided by transceiver 110).

Upon receiving the signal indicating the product(s), product quantity(ies), and resident location, the compute device 160 can associate or link resident compute device 140 with transceiver 110. Based on the product(s), product quantity(ies), and resident location, compute device 160 can associate transceiver 110 with the residence of resident compute device 140. For example, the residence address provided by retailer compute device 150 can indicate the general location of the home and yard, while the GPS coordinates provided by transceiver 110 can indicate a location within that general location, for instance specifying a particular portion of the yard (a "landing zone"). By identifying the GPS coordinates provided by transceiver 110 being within the general location indicated by the residence address, the compute device 160 can associate or link the resident compute device 140 and transceiver 110 as being owned, controlled, and/or possessed by the same resident. The compute device 160 can then initiate the drone delivery process, for example, by sending to drone controller 170 a signal indicating the product(s), product quantity(ies) and resident information (such as GPS coordinates and/or GPS accuracy as provided by transceiver 110).

Compute device 160 can be, for example, any type of computer, server, etc. that has a processor that executes instructions such as software instructions stored in a memory of compute device 160. The compute device 160 includes a processor, a memory operatively coupled to the processor, and a transceiver operatively coupled to the processor and the memory. The memory can include a mission generator, a flight path generator and a mapping database. The mission generator can determine or identify mission information such as the product(s) to be supplied and the drone(s) to deliver the supply product(s), based on the signal received from retailer compute device 150 (via network 130 or via retailer compute device 150 if directly connected) and representing or identifying the product and/or quantity information for the supply product(s). The selection of the drone(s) to deliver the supply product(s) can be based on the location or proximity of the drone(s) relative to the residence to where the product(s) is to be delivered. For example, if the product(s) is available only at certain locations, then the drone(s) can be selected based on the proximity to the product(s) and whether a mechanism is available for loading the product(s) on the drone(s) (e.g., whether automatic loading, manual loading and/or pre-loading of product(s) is available). The memory of compute device 160 can store the information related to the product and drone availability, and such information can be updated as product(s) and drone(s) are used or deployed. Once the mission has been generated by the mission generator (e.g., selecting which drone(s) will deliver which product(s) to which designated drop location(s)), the flight path generator can calculate a flight path for a drone 180 that is dispatched to supply product as described further herein. The mapping database can include topographic map information for the geographic area for the start location, the designated drop location and other possible designated drop locations for other residences.

Drone controller 180 is operatively coupled to the compute device 160 via network 130, and also operatively coupled to drone 180 for at least an initial portion of the flight of the drone 170. In some implementations, drone controller 170 can communicate with and control a single drone 180. In other implementations, drone controller 170 can communicate with and control multiple drones 180. When drone controller 170 communicates with and controls a single drone 180, the compute device 160 can communicate with drone controller 170 (and not other drone controllers 170) based on the drone selection information of the mission information determined by the mission generator. When drone controller 170 communicates with and controls multiple drones 180, the compute device 160 can communicate with drone controller 170 such that drone controller 170 can select from among the associated drones 180 which drone(s) 170 to deploy for a given mission based on the mission information provided by the mission generator.

The drone controller 170 can receive the flight path information from compute device 160 (after being generated by the flight path generator of compute device 160). The drone controller 170 can relay the flight path information to drone 180 so that the drone 180 can fly to the residence at the address and/or the geolocation location coordinates provided by GPS transceiver 120. The connection between drone controller 180 and drone 170 is present at the pre-flight stage of the operation of drone 170, and optionally not after the drone 170 has started its flight.

Drone 180 can any type of appropriate unmanned autonomous vehicle (UAV) and can operate with any type of appropriate autonomous control. For example, drone 180 can operate autonomously based on an onboard processor (not shown in FIG. 1) or piloted by an autonomous robot (such as an autonomous robot optionally included in drone controller 170). Drone 180 is sized and configured to carry the product(s) and travel to the residence with the selected product(s) and return without the product(s). Thus, the heavier the product(s) and the greater the distance between the initial position of the drone 180 and the residence, then the larger the drone 180 will likely be.

Drone 180 can carry a product 190 that is delivered from an initial location remote from the residence to a location at the residence (also referred to herein as the "start location" and the "designated drop location"). For example, the drone 180 can be loaded with the product in response to compute device 160 receiving the request from retailer compute device 150. Such loading can be done automatically (e.g., by autonomous flight instructions to pick up the resupply product pre-flight) or manually. Alternatively, the drone 180 can be pre-loaded with a particular product 190 so that, upon receiving a request for that particular product, that drone 180 is deployed with the pre-loaded product.

The drone 180 travels from the start location to the designated drop location while taking into account the relative elevation differences calculated by the flight path generator, the altitude measurements taken by the altitude sensor(s) of drone 180 and, when available and working accurately, the elevation measurements taken by the elevation sensor(s) of drone 180. The processes for determining the height of the drone is discussed further below in connection with FIGS. 3-7.

Once the drone 180 reaches the designated drop location within the property of the residence, the drone 180 can release the product(s) 190, for example automatically or via a pilot instruction via the drone controller 170. For example, the flight plan of the drone 180 can be such that the drone 180 will not land but instead will hover above or near the designated drop location and then release the product(s) 190. For example, the flight plan can be defined such that when drone 180 is within a predefined horizontal distance from the designated drop location (e.g., nine feet) and a predefined vertical distance from the designated drop location (e.g., eight feet), the drone 180 can release the product(s) 190 and then travel to a defined location (e.g., the starting location of the drone 180 during the mission or a different location defined by the flight plan according to the mission). In some implementations, the vertical distance from the designated drop location at which the drone 180 releases product(s) 190 can vary depending on the weight and/or type of the resupply product(s) 190, and can be determined/defined before during the flight of the drone 180. For example, the vertical distance from the designated drop location at which the drone 180 releases product(s) 190 can be defined when the drone 180 is loaded with the resupply product(s) 190 pre-flight, and/or can be defined after the drone 180 has been loaded with the product(s) and during flight. In some implementations, the drone 180 can delay automatically releasing the product(s) 190 until an accuracy of the GPS location of the designated drop location is within a predefined threshold. For example, if the accuracy of the GPS location is only 25 meters but the predefined threshold 10 meters, then the drone 180 can maintain its location until the GPS accuracy improves to 10 meters or less, and then adjust its position toward the designated drop location based on the updated GPS location and then release the product(s) 190.

Although FIG. 2 is discussed in the context of a single drone 180 performing a single mission to deliver a product(s) to a single residence, it should be understood that a given drone 180 can deliver a product(s) to each of multiple residences within a single mission (e.g., delivering half of the products to one residence and then the other half of the products to a second residence). Similarly, a drone 180 can perform multiple missions to deliver multiple types of products and/or to multiple residences. For example, a drone 180 can be instructed to deliver product(s) to a residence, return to the starting location to add more product(s), and then deliver the product(s) to the same residence (or a different residences). For example, a drone 180 can be instructed to deliver product to a residence, travel to a different supply location to obtain more (or different) product, deliver the product to a residence (the same or different residence), etc. Finally, multiple drones 180 can be instructed to perform a coordinated single mission, for example, flying in a swarm configuration for a common designated drop location or proximate multiple designated drop locations.

In some implementation, the drone 180 can be included within a swarm of drones 180 destined for the same general geographic area, e.g., where several residents in the geographic area request product(s) within a similar time period. In such situations, a swarm of drones 180 can be deployed within a similar time period and in a coordinated manner to avoid collisions among the drones 180. De-confliction a swarm of drones 180 can be performed, for example, by flying different drones 180 at different altitudes until the swarm of drones 180 arrive near or within a perimeter of the residents requesting the drone 180. Once at such a perimeter, a device-to-device de-confliction can be performed, for example, slot scheduling so that different drones 180 fly towards the residences in different time slots and/or different geographic corridors. In some implementations, the drones 180 can include transponders to assist in the drones 180 avoiding colliding with each other.

Figure 3:
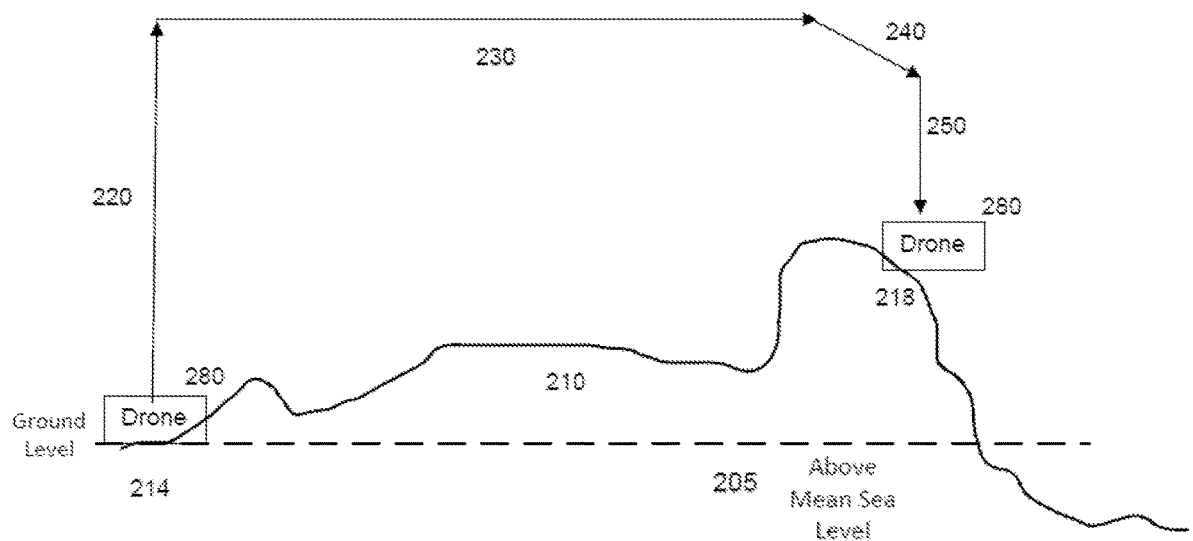
FIG. 3 shows an example of a diagram of an aerial drone flying from a start location to a designated drop location.

FIG. 3 shows an example of a diagram of an aerial drone flying from a start location to a designated drop location. FIG. 3 can be based on, for example, a mission defined by a mission generator (e.g., a mission generator of compute device 160 of FIG. 2) and the flight path information defined by flight path generator (e.g., a flight path generator of compute device 160 of FIG. 2). The flight path can be determined before the drone flight by the flight path generator based on the terrain 210 between the start location 214 and the desired drop location 218, based on location regulations on allowable altitudes for drone (e.g., depending on the regulatory approval for the drone), known obstacles (e.g., streets, parking lots, airports, etc.), and/or known desirable paths (e.g., over unpopulated areas). The flight path information can be provided to the drone controller and/or the drone 280 via the drone controller. In the example of FIG. 3, the flight path from the start location 214 to the designed drop location 218 includes flight path portions 220, 230, 240 and 250.

Also before flight of the drone 280, predetermined elevation values of the start location and the designated drop location can be obtained. For example, such predetermined elevation values can be obtained, for example, from topographic maps and can be stored in a mapping database (e.g., the mapping database of compute device 160 in FIG. 2). Such topographic maps can be obtained, for example, from the USGS and stored in the mapping database. The topographic maps can be supplemented with additional information (e.g., as provided by commercial entities) as desired to provide a higher level of accuracy or precision in the elevation values for a particular geographic area(s) where the drone(s) will be used. The flight path generator can obtain the elevation values of the start location and the desired drop location from the mapping database, and then calculate a relative difference between the elevation of the start location and the elevation of the designated drop location. The relative elevation difference can be used by the drone as a proxy for height at the designated drop location relative to the start location, as described further below.

As shown in FIG. 3, a geographic area can have an above mean sea level (AMSL) 205 and a terrain 210 having a surface with varied elevations. Although not shown in FIG. 3, terrain 210 can have various objects that affect the topology such as buildings, roads, etc. In the example of FIG. 3, the drone 280 starts at the start location 214. The drone 280 can take off at start location 214 with the tethered product (not shown in FIG. 3) attached to the drone 280 (e.g., with an eight feet tether). The drone 280 has an altitude of zero while on the ground and then can raise to a position to take up the slack in the tether and raise the product off the ground a relatively small amount (e.g., a height of 4 meters, between the drone 280 to the ground). At this position that drone 280 can take a first altitude measurement (e.g., with respect to AMSL) and provide this first altitude value to a compute device (e.g., compute device 160 of FIG. 2) via the drone controller (e.g., drone controller 170 of FIG. 2). The compute device can store the value of the first altitude value and the elevation at the start location.

After measuring the first altitude value, the drone 280 can rise to a transit flight altitude (e.g., 300 feet) via the flight path portion 220. Upon reaching the transit flight altitude, the drone 280 can travel towards the designated drop location 218 via flight path portion 230, while substantially maintaining the transit flight altitude (e.g., variation from the transit flight altitude are possible where appropriate).

Once the drone 280 approaches more closely towards the designated drop location 218, the drone 280 can adjust its altitude and location via the flight path portion 240. The flight path portion 240 can be predetermined by the flight path generator or can be modified/augmented by a pilot controlling the drone 280 via the drone controller. Once the drone 280 reaches the end point of flight path portion 240, the drone 280 can perform a second altitude measurement and send the second altitude value to the drone controller and/or the compute device via the drone controller.

In instances where drone 280 does not have a sensor to measure the height or where the drone 280 has a height sensor that is blocked by the tethered package, the drone 280 can rely on the relative elevation difference calculated by the flight path generator (between the start location and the designated drop location). Following the example of FIG. 3, consider an example where the altitude of the drone 280 at the start location is zero, the drone 280 lifts to position to take up the slack in the tether and raise the product off the ground a relatively small amount such that the altitude of the drone 280 is 4 meters. When the drone 280 is at the end of the flight path portion 240, the relative elevation difference (i.e., elevation difference between start location 214 and drop location 218) calculated by the flight path generator can be used to indicate the height of the drone 280. For example, if the relative elevation difference is 26 meters and the altitude of the drone with the tether slack taken up (and the product is off the ground a relatively small amount) is 4 meters, then the target altitude of the drone 280 for releasing, detaching and/or dropping the product is 30 meters. Thus, if the drone 280 at the end of the flight path portion 240 measures its altitude and determines that the drone 280 is more than 30 meters above the ASML 205, then the drone 280 can move along flight path portion 250 until the drone 280 measures an altitude that is 30 meters above the ASML 205. At that point, the drone 280 can release, detach and/or drop the product from the tether to place the product in the "landing zone" of the design drop location. In instances, where a "landing zone" is not identified as GPS location values are not provided by transceiver 110, then the drone 280 can place the product within the residence's property as specified by the residence address and/or the GPS coordinates determined by the GPS sensor on the drone 280.

In instances where drone 280 has a sensor to measure the height and the tethered package does not block the height sensor, the drone 280 can use the relative elevation difference calculated by the flight path generator to provide a failsafe check against the height sensor measurements. For example, towards the end of the flight path portion 250, the height sensor on the drone 280 indicates that the height is 20 meters, but if the altitude sensor on the drone 280 combined with the relative elevation difference calculated by the flight path generator indicates that the drone 280 is 10 meters, then the height sensor can be identified as having a potential problem such as being calibrated incorrectly or measuring an known obstruction. When such a potential problem is identified, a remedial action can be taken such as modifying the designed drop location 218, or having the drone abort the product delivery and travel to another location such as returning to the start location 214.

Figure 4:
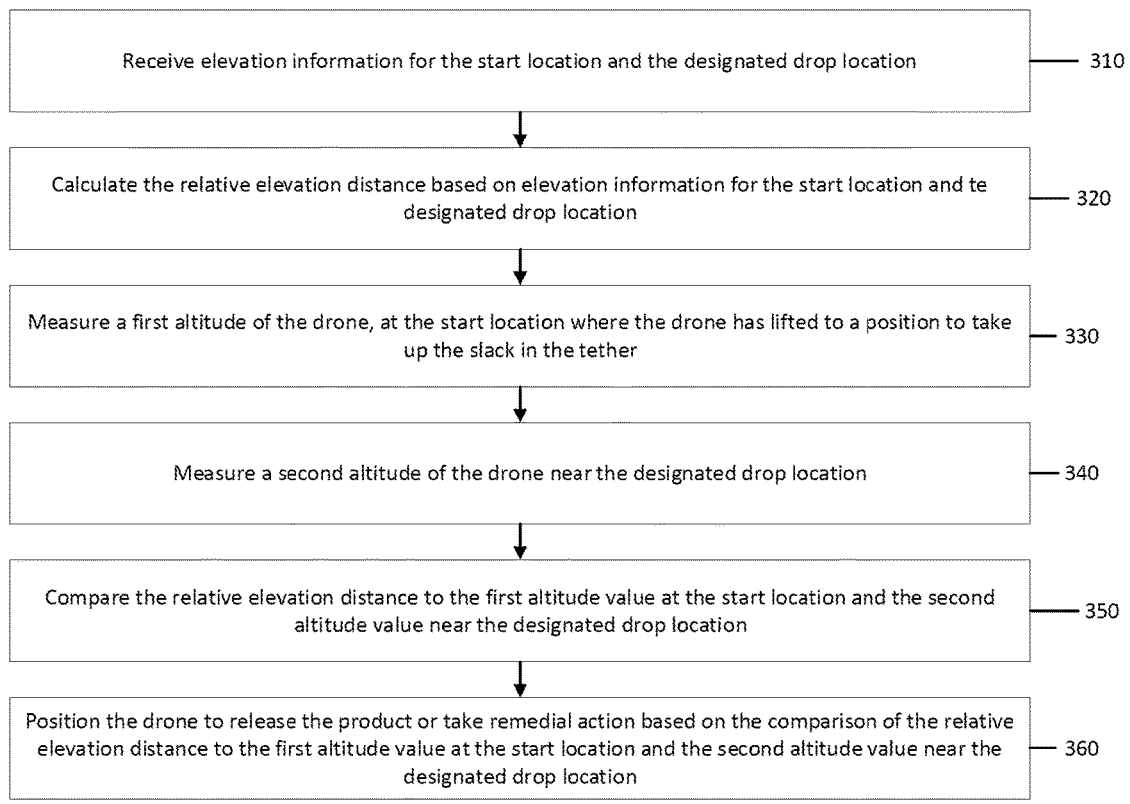
FIG. 4 shows a flowchart of a method of calculating a relative elevation different and sending a drone to deliver product based on the relative elevation different, according to an embodiment.

FIG. 4 shows a flowchart of a method of calculating a relative elevation difference and sending a drone to deliver product based on the relative elevation different, according to an embodiment. As shown in FIG. 4, at 310, the elevation information for the start location and the designated drop location for a given mission is received (e.g., at mapping database from a flight path generator, of FIG. 2). At 320, the relative elevation difference is calculated (e.g., at the flight path generator of FIG. 2) based on the elevation information for the start location and the designated drop location. At 330, a first altitude value is measured at the start location where the drone has lifted to a position to take up the slack in the tether (and optionally raise the product off the ground a relatively small amount). At 340, once the drone positioned above and near the designated drop location, a second altitude value is measured. At 350, the relative elevation distance is compared to the difference between the first altitude value and the second altitude value. At 360, the drone is positioned to release the product or a remedial action is taken based on the comparison of the relative elevation distance calculated by the flight path generator and the difference between the first altitude value and the second altitude value.

Figure 5:
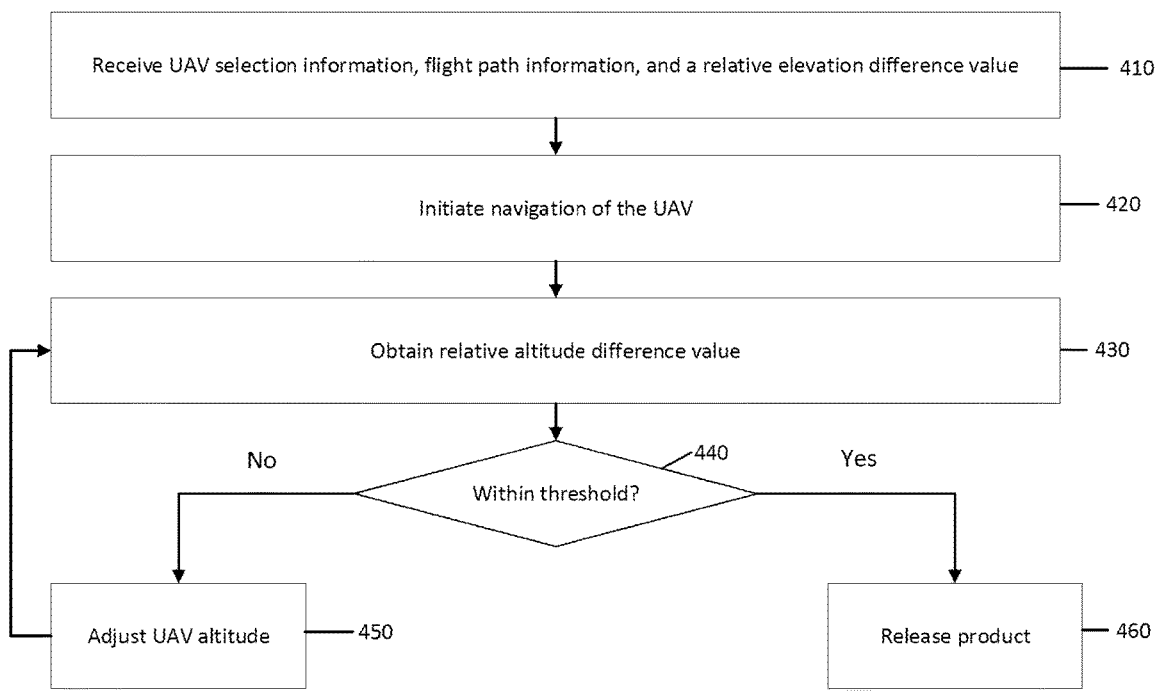
FIG. 5 shows a flowchart of a method for a UAV controller to cause a UAV to deliver a product to a drop location, according to an embodiment.

FIG. 5 shows a flowchart of a method for delivering a product to a drop location, according to an embodiment. In one or more implementations, the method of FIG. 5 can be performed by a UAV controller (e.g., drone controller 170). At 410, UAV selection information, flight path information, and a relative elevation difference value is received. The UAV selection information can indicate at least one UAV to be used for a delivery, the flight path information can indicate the flight path for the at least one UAV to take, and the relative elevation difference can indicate the difference between the start location elevation and drop location elevation. At 420, navigation of the at least one UAV is initiated using the flight path information and the UAV selection information from 410. At 430, a relative altitude difference value is obtained, which is a difference between a first altitude value of the at least one UAV near the start location, and a second altitude value of the at least one UAV near the drop location. At 440, it is determined whether or not the relative altitude difference value from 430 is within an acceptable range of the relative elevation difference value, also referred to herein as being within a predetermined threshold. If the answer at 440 is no, at 450 the at least one UAV can adjust its altitude near the drop location, repeat 430 to obtain an updated relative altitude difference value, and repeat 440. If the answer at 440 is yes, at 460, a signal is sent to cause the UAV to release the product at the drop location.

In some implementations, the method shown in FIG. 5 can further comprise determining, after 430 but before 440, a height of the UAV using the altitude and elevation information from 410 and 430, receiving a height measurement from a height sensor on the UAV, and marking the height sensor to be potentially faulty if the height sensor measurement is outside a predefined threshold (also referred to herein as a "second predefined threshold" that is different from the predetermined threshold referenced in 440) relative to the height determined using the information from 410 and 430. The height information determined using the information from 410 and 430 for comparing against the height measurement from the height sensor refers to the distance between the UAV and the drop location, and can be determined by subtracting the elevation of the drop location from the altitude of the UAV at the drop location. If the height measurement from the height sensor is outside an acceptable range relative to the height information determined using the information from 410 and 430 (e.g. +/−10%, +/−2 meters, +/−1 meter, +/−0.5 meter), the height sensor can be marked as potentially faulty.

Figure 6:
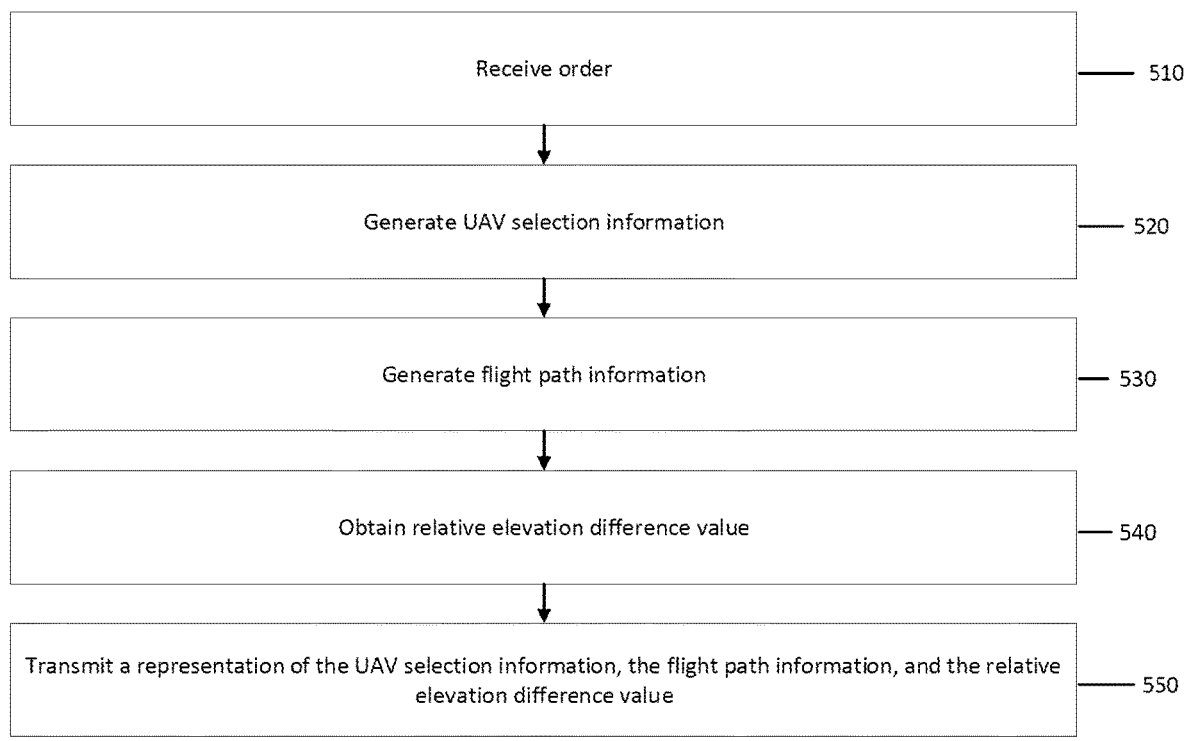
FIG. 6 shows a flowchart of a method for a compute device to cause a UAV to deliver a product to a drop location, according to an embodiment.

FIG. 6 shows a flowchart of a method for delivering a product to a drop location, according to an embodiment. In one of more implementations, the method of FIG. 6 can be performed by a compute device (e.g., compute device 160). At 510, an order that includes a representation of an identity of a product and a drop location for the product is received. At 520, UAV selection information identifying at least one UAV to perform the delivery of the product to the drop location is generated. At 530, flight path information for the at least one UAV selected at 520 is generated. At 540, a relative elevation difference value is obtained using elevation values at the start location and the drop location. At 550, a representation of the UAV selection information from 520, the flight path information from 530, and the relative elevation difference value from 540 is sent to a UAV controller to cause the UAV controller to obtain a relative altitude difference of the at least one UAV using altitude measurements (or altitude values) near the start and drop locations, and cause the UAV to adjust its altitude near the drop location if it was determined to be outside an acceptable range of the drop location.

Figure 7:
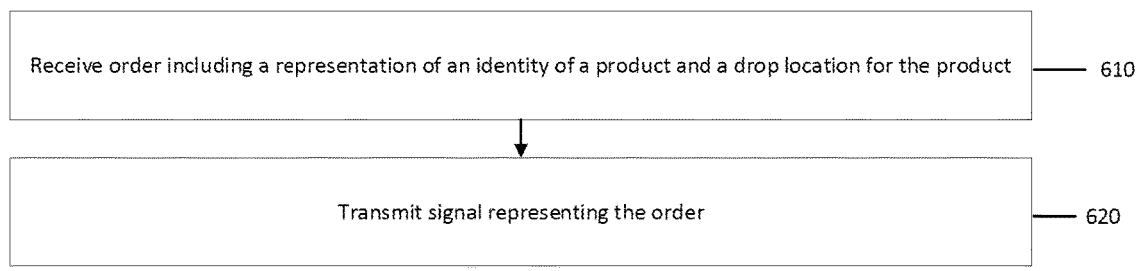
FIG. 7 shows a flowchart of a method for a retailer compute device to cause a UAV to deliver a product to a drop location, according to an embodiment.

FIG. 7 shows a flowchart of a method for delivering a product to a drop location, according to an embodiment. In one or more implementations, the method of FIG. 7 can be performed by a retailer compute device (e.g. retailer compute device 150). At 610, an order including a representation of an identity of a product and a drop location for the product is received. At 620, a signal representing the order is transmitted to a compute device to cause the compute device to (1) generate UAV selection information, flight path information, and a relative elevation difference value between the start location elevation and the drop location elevation, and (2) cause a UAV controller to (a) obtain a relative altitude difference value for at least one UAV associated with the UAV selection information using altitude information of the at least one UAV near the start location and the drop location, and (b) update the altitude of the at least one UAV if the is relative altitude difference value outside an acceptable range relative to the relative elevation difference value.

In some implementations, an indication that the order is to be made using UAV delivery is received prior to 610. In some implementations, the order further includes a quantity of the product.

Note that although the above discussion contemplates a GPS transceiver 120 and a transceiver 110 at the residence to define a "landing zone" for product delivery, it should be understand that such transceivers are optional and the delivery of product discussed herein including the discussion of FIGS. 2-7 can be performed based on the residence address provided by the residence compute device 140 and not requiring the GSP transceiver 120 and transceiver 110.

Note also that although FIG. 3 is discussed in reference to flight path portion 230 for the long-haul transit of the drone, it should be understood that such a flight path portion can be varied beyond a merely straight line path. For example, it may be desirable (or required by regulations) for the drone to avoid certain objects (e.g., people outside, cars traveling on the road, cars in parking lots, etc.). Thus, the flight path including the long-haul flight path portion can be modified for example by a pilot, automatically by a compute device, or a combination of both. For example, in some instances, a pilot can select way points to avoid the drone flying over certain objects. Alternatively, a compute device (e.g., via flight path generator of FIG. 2) can automatically select a flight path to avoid the drone flying over certain objects. For example, the compute device can use machine learning models to automatically identify building roofs, roads, swimming pools, parks, etc. to select objects to avoid (e.g., roads) and other objects to fly over (e.g., building roofs, swimming pools, parks). In some instances, the compute device (without or without machine learning models) can select a path based on a selection algorithm like an open safest path first (OSPF) algorithm that selects the short path via available objects and/or minimizing flying over objects to be avoided. In instances where the drone(s) will repeated fly over a crowded area (e.g., an urban or suburban setting around a retailer building), the compute device can use a modified version of an OSPF algorithm where paths are varied to avoid flying over the same structures (e.g., homes) within the crowed area.

The various embodiments described herein can be used in conjunction with a compute device accessed by the resident (e.g., a resident compute device such as resident compute device 140 of FIG. 2) to assist the resident in the direction in which the drone (e.g., drone 180 of FIG. 2) is approaching the residence. In particular, the resident compute device can execute software (such as an application) that can receive an image or video of the sky from the residence. For example, when the resident compute device is a mobile smart phone, the resident can position the resident compute device towards the sky with the camera being activated, for example, by the application to determine the resident's position and/or orientation relative to the drone's approach. Alternatively, the resident compute device can activate and/or access a compass function on the resident compute device to determine the resident's position and/or orientation relative to the drone's approach. Once the resident's position and/or orientation is determined, the resident can be informed of the drone's direction and/or elevation of approach towards the residence via an output device/component of the resident compute device (e.g., a display). This can allow the resident to better identify the drone in the sky as the drone approaches the residence.

More specifically, the resident compute device can receive flight path information of the drone from the compute device that generates the flight path (e.g., compute device 160 of FIG. 2) or from a drone controller (e.g., drone controller 170 of FIG. 2), via a network interconnecting these devices (e.g., network 130 of FIG. 2). The flight path information can be provided/updated during the entire flight path of the drone or alternatively, can be provided/updated towards an end portion of the flight path of the drone. In this latter instance, the end portion of the flight path of the drone can correspond to the point at which the resident could possibly see the drone in the sky from the residence. In some instances, weather information including visibility information for the area including the residence can be used to determine the end portion of the flight path of the drone at which the resident could possibly see the drone. This weather/visibility information can be obtained by the resident compute device or received at the resident compute device from the compute device that generates the flight path or from the drone controller.

In instances where the drone includes a transmitter that can communicate with the resident compute device, the drone can send a signal with an identifier to the resident compute device so that the resident compute device can confirm the identity of the approaching drone. This can be particularly helpful when multiple drones are flying around the residence and the specific drone flying to the residence can be distinguished by the identifier received at the resident compute device.

In some instances, the application executing on the resident compute device can receive information that identifies the speed of the drone and its distance from the residence. In other some instances, the application executing on the resident compute device can receive information on the distance between the drone and the residence, and then determine the speed of the drone based on a change in distance over time. Alternatively, the resident compute device can calculate the changing distance between the drone and the residence based on the increasing size of the drone within the camera of the resident compute device, or based on the decreasing time between pulses sent from the drone, as the drone approaches the residence. Based on the speed of the drone and its distance of the drone from the residence, the resident compute device can calculate the estimated time of arrival of the drone.

In one or more embodiments, a method, comprises: receiving (1) unmanned autonomous vehicle (UAV) selection information identifying a UAV, (2) flight path information, and (3) a relative elevation difference value that is a difference between a first elevation value of a start location and a second elevation value of a drop location; initiating navigation of the UAV using the UAV selection information and the flight path information; obtaining a relative altitude difference value using a first altitude value of the UAV associated with the start location and a second altitude value of the UAV associated with the drop location; and in response to a difference between the relative elevation difference value and the relative altitude difference value being outside a predefined threshold, causing the UAV to adjust the second altitude value such that an updated difference between the relative elevation difference value and an updated relative altitude difference value is within the predefined threshold.

In some implementations, the first elevation value and the second elevation value are obtained prior to the initiating of the UAV for navigation.

In some implementations, the first elevation value and the second elevation value are obtained from a mapping database.

In some implementation, the predefined threshold is a first predefined threshold, further comprising: receiving, from a height sensor associated with the UAV, a height sensor measurement at the drop location, the height sensor measurement indicating a predicted distance between the UAV above the drop location and the drop location; and in response to the height sensor measurement being outside a second predefined threshold relative to a difference between the second altitude value and the second elevation value, causing the height sensor to be identified as providing a potentially faulty height sensor measurement.

Some implementations further comprise: receiving, after the initiating, a representation of updated flight path information from a compute device configured to receive a representation of the updated flight path information manually from a user; and causing the UAV to navigate based on the updated flight path information in lieu of the flight path information.

In some implementations, the UAV is an aerial drone selected from a plurality of aerial drones.

In some implementations, the UAV is operatively coupled to a tether, the tether is operatively coupled to a product to be released at the drop location, and at least one of the tether or the product interferes with an altitude sensor associated with the UAV and measuring a distance between the UAV and the drop location.

In some embodiments, a method, comprises: receiving an order that includes a representation of an identity of a product and a drop location for the product; generating, via a processor, unmanned autonomous vehicle (UAV) selection information identifying a UAV; generating, via the processor, flight path information for the UAV; obtaining, via the processor, a relative elevation difference value using a first elevation value of a start location and a second elevation value of the drop location; and transmitting a representation of the UAV selection information, the flight path information and the relative elevation difference value to a UAV controller to cause the UAV controller to: obtain a relative altitude difference value using a first altitude value of the UAV associated with the start location and a second altitude value of the UAV associated with the drop location, and in response to a difference between the relative elevation difference value and the relative altitude difference value being outside a predefined threshold, causing the UAV to adjust the second altitude value such that an updated difference between the relative elevation difference value and an updated relative altitude difference value is within the predefined threshold.

Some implementations further comprise: processing information associated with an availability of the product; and processing information associated with which UAVs are available for usage, the generating the UAV selection information identifying the UAV being based on the information associated with the availability of the product and the information associated with which UAVs are available for usage.

In some implementations, the flight path information causes the UAV to minimize flying over densely populated areas between the start location and the drop location.

In some implementations, the order is received from a retailer compute device and placed by a resident compute device associated with the drop location and separate from the retailer compute device.

Some implementations further comprise: causing transmission of at least a portion of the flight path information of the UAV to a resident compute device associated with the drop location to enable the resident compute device to track a location of the UAV.

In some implementations, the drop location for the product includes global position system (GPS) coordinate information for the drop location and GPS accuracy information associated with the GPS coordinate information for the drop location.

Some implementations further comprise: receiving a representation of nearby UAVs and locations associated with each UAV from the nearby UAVs; and in response to a location associated with a nearby UAV from the nearby UAVs being within a predefined proximity threshold of the UAV, updating the flight path information of the UAV to cause the nearby UAV to be located outside the predefined proximity threshold of the UAV.

In some implementations, the UAV is operatively coupled to a tether, the tether is operatively coupled to the product to be released at the drop location, and at least one of the tether or the product interferes with a height sensor associated with the UAV and measuring a distance between the UAV and the drop location.

In some embodiments, a method comprises: receiving an order including a representation of an identity of a product and a drop location for the product; and transmitting a signal representing the order to a compute device to cause the compute device to (1) generate unmanned autonomous vehicle (UAV) selection information, flight path information and a relative elevation difference value that is a difference between a first elevation value of a start location and a second elevation value of a drop location, and (2) cause an UAV controller to: obtain a relative altitude difference value using a first altitude value of an UAV associated with the start location and a second altitude value of the UAV associated with the drop location, and in response to a difference between the relative elevation difference value and the relative altitude difference value being outside a predefined threshold, cause the UAV to adjust the second altitude value such that an updated difference between the relative elevation difference value and an updated relative altitude difference value is within the predefined threshold.

Some implementations further comprise: obtaining, before the transmitting, an indication of a preferred method of delivery; and in response to the indication of the preferred method of delivery is delivery by UAV, performing the transmitting.

In some implementations, the order is received from a resident compute device.

In some implementations, the order represents the drop location by an address, but not global positioning system (GPS) coordinates.

In some implementations, the UAV is operatively coupled to a tether, the tether is operatively coupled to the product to be released at the drop location, and at least one of the tether or the product interferes with a height sensor associated with the UAV and measuring a distance between the UAV and the drop location.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

What is claimed is:

1. A non-transitory processor-readable medium storing code representing processor-executable instructions, the code comprising code to cause the processor to:
   obtain a relative altitude difference value using a first altitude value of an unmanned autonomous vehicle (UAV) associated with a start location and a second altitude value of the UAV associated with a drop location;
   calculate a difference between a relative elevation difference value and the relative altitude difference value, the relative elevation difference value being a difference between a first elevation value of a start location and a second elevation value of the drop location; and
   cause (1) the UAV to adjust the second altitude value, in response to the difference between the relative elevation difference value and the relative altitude difference value being outside a predefined threshold, such that an updated difference between the relative elevation difference value and an updated relative altitude difference value is within the predefined threshold, or (2) the UAV to release a product at the drop location, in response to the difference between the relative elevation difference value and the relative altitude difference value being within the predefined threshold.

2. The non-transitory processor-readable medium of claim 1, wherein the first elevation value and the second elevation value are obtained prior to an initiation of navigation of the UAV.

3. The non-transitory processor-readable medium of claim 1, wherein the first elevation value and the second elevation value are obtained from a mapping database.

4. The non-transitory processor-readable medium of claim 1, wherein the predefined threshold is a first predefined threshold, the code further comprising code to cause the processor to:
   receive, from a height sensor associated with the UAV, a height sensor measurement at the drop location, the height sensor measurement indicating a predicted distance between the UAV above the drop location and the drop location; and
   in response to the height sensor measurement being outside a second predefined threshold relative to a difference between the second altitude value and the second elevation value, cause the height sensor to be identified as providing a potentially faulty height sensor measurement.

5. The non-transitory processor-readable medium of claim 1, the code further comprising code to cause the processor to:
- initiate navigation of the UAV using, in part, flight path information;
- receive, after the initiating, a representation of updated flight path information from a compute device configured to receive a representation of the updated flight path information manually from a user; and
- cause the UAV to navigate based on the updated flight path information in lieu of the flight path information.

6. The non-transitory processor-readable medium of claim 1, the code further comprising code to cause the processor to:
- receive UAV selection information identifying the UAV, the UAV being an aerial drone selected from a plurality of aerial drones.

7. The non-transitory processor-readable medium of claim 1, wherein:
- the UAV is operatively coupled to a tether that is operatively coupled to a product to be released at the drop location, and
- at least one of the tether or the product interferes with a height sensor associated with the UAV and measuring a distance between the UAV and the drop location.

8. The non-transitory processor-readable medium of claim 1, the code further comprising code to cause the processor to:
- receive UAV selection information identifying the UAV;
- receive flight path information; and
- initiate navigation of the UAV using the UAV selection information and the flight path information.

9. An apparatus, comprising:
- a processor configured to obtain a relative elevation difference value using a first elevation value of a start location for an ordered product and a second elevation value of a drop location for the ordered product; and
- a transceiver operatively coupled to the processor, the transceiver configured to transmit a representation of unmanned autonomous vehicle (UAV) selection information identifying a UAV, flight path information for the UAV and the relative elevation difference value to a UAV controller to cause the UAV controller to:
  - obtain a relative altitude difference value using a first altitude value of the UAV associated with the start location and a second altitude value of the UAV associated with the drop location, and
  - cause (1) the UAV to adjust the second altitude value, in response to a difference between the relative elevation difference value and an updated relative altitude difference value being outside a predefined threshold such that an updated difference between the relative elevation difference value and an updated relative altitude difference value is within the predefined threshold, or (2) the UAV to release the ordered product at the drop location, in response to the difference between the relative elevation difference value and the updated relative altitude difference value being within the predefined threshold.

10. The apparatus of claim 9, wherein the processor is configured to:
- process information associated with an availability of the ordered product;
- process information associated with which UAVs are available for usage; and
- generate the UAV selection information, based on the information associated with the availability of the ordered product and the information associated with which UAVs are available for usage.

11. The apparatus of claim 9, wherein the processor is configured to generate the flight path information for the UAV so that the flight path information causes the UAV to minimize flying over densely populated areas between the start location and the drop location.

12. The apparatus of claim 9, wherein:
- the processor is configured to be in electronic communication with a retailer compute device,
- the processor is configured to receive, via the transceiver operatively coupled to the processor and from the retailer computer device, an order that includes a representation of an identity of the ordered product and the drop location for the ordered product,
- the order being placed by a resident compute device associated with the drop location and separate from the retailer compute device.

13. The apparatus of claim 9, wherein the processor is configured to cause transmission of at least a portion of the flight path information of the UAV to a resident compute device associated with the drop location to enable the resident compute device to track a location of the UAV.

14. The apparatus of claim 9, wherein the drop location for the ordered product includes global position system (GPS) coordinate information for the drop location and GPS accuracy information associated with the GPS coordinate information for the drop location.

15. The apparatus of claim 9, further comprising:
- a flight path generator operatively coupled to the processor, the flight path generator configured to receive a representation of nearby UAVs and locations associated with each UAV from the nearby UAVs, the flight path generator configured, in response to a location associated with a nearby UAV from the nearby UAVs being within a predefined proximity threshold of the UAV, update the flight path information of the UAV to cause the nearby UAV to be located outside a predefined proximity threshold of the UAV.

16. The apparatus of claim 9, wherein:
- the UAV is operatively coupled to a tether that is operatively coupled to the ordered product to be released at the drop location, and
- at least one of the tether or the ordered product interferes with a height sensor associated with the UAV and measuring a distance between the UAV and the drop location.

17. An apparatus, comprising:
- a processor configured to receive an order including a representation of an identity of a product and a drop location for the product; and
- a transceiver configured to transmit from the processor a signal representing the order to a compute device to cause the compute device to (1) generate a relative elevation difference value that is a difference between a first elevation value of a start location and a second elevation value of the drop location, and (2) cause an unmanned autonomous vehicle (UAV) controller to:
  - obtain a relative altitude difference value using a first altitude value of a UAV associated with the start location and a second altitude value of the UAV associated with the drop location, and
  - cause (1) the UAV to adjust the second altitude value, in response to a difference between the relative elevation difference value and the relative altitude difference value being outside a predefined threshold, such that an updated difference between the relative elevation difference value and an updated relative altitude difference value is within the predefined threshold, or (2) the UAV to release the product at the drop location, in response to the difference between the relative elevation difference value and the updated relative altitude difference value being within the predefined threshold.

18. The apparatus of claim 17, wherein the processor is configured to obtain, before the transmitting, an indication of a preferred method of delivery, the processor configured to cause the transceiver to perform the transmitting in response to the indication of the preferred method of delivery is delivery by UAV.

19. The apparatus of claim 17, wherein the order is received from a resident compute device.

20. The apparatus of claim 17, wherein the order represents the drop location by an address, but not global positioning system (GPS) coordinates.

21. The apparatus of claim 17, wherein:
the UAV is operatively coupled to a tether that is operatively coupled to the product to be released at the drop location, and
at least one of the tether or the product interferes with a height sensor associated with the UAV and measuring a distance between the UAV and the drop location.

\* \* \* \* \*

UNITED STATES PATENT AND TRADEMARK OFFICE
CERTIFICATE OF CORRECTION

PATENT NO.          : 11,789,463 B2
APPLICATION NO.  : 17/892595
DATED               : October 17, 2023
INVENTOR(S)      : John Vernon et al.

It is certified that error appears in the above-identified patent and that said Letters Patent is hereby corrected as shown below:

On the Title Page

Item (73) Assignee:
"Drone Up, LLC, Virginia Beach, VA (US)"
Should read:
--DroneUp, LLC, Virginia Beach, VA (US)--

Signed and Sealed this
Ninth Day of April, 2024

*Katherine Kelly Vidal*
Katherine Kelly Vidal
*Director of the United States Patent and Trademark Office*